April 21, 1959 T. R. ANDERSON, SR 2,882,716
APPLYING AND SPREADING IMPLEMENT FOR MASTIC
CEMENTITIOUS MATERIAL
Filed June 22, 1955
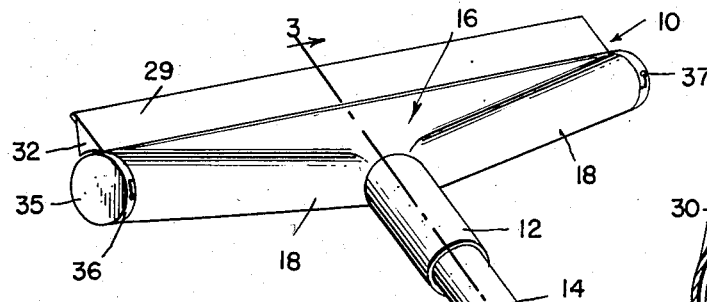
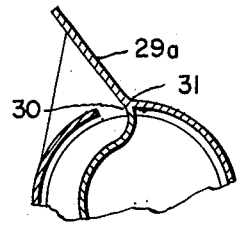
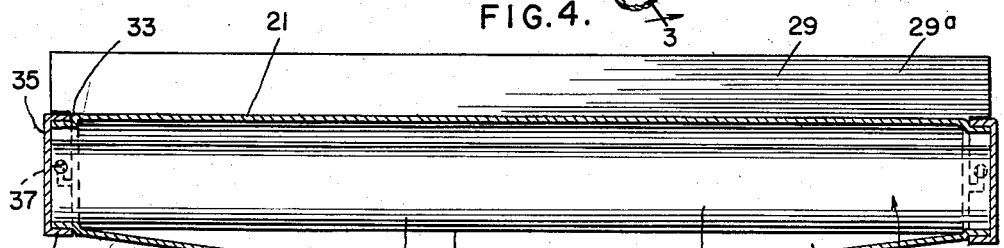
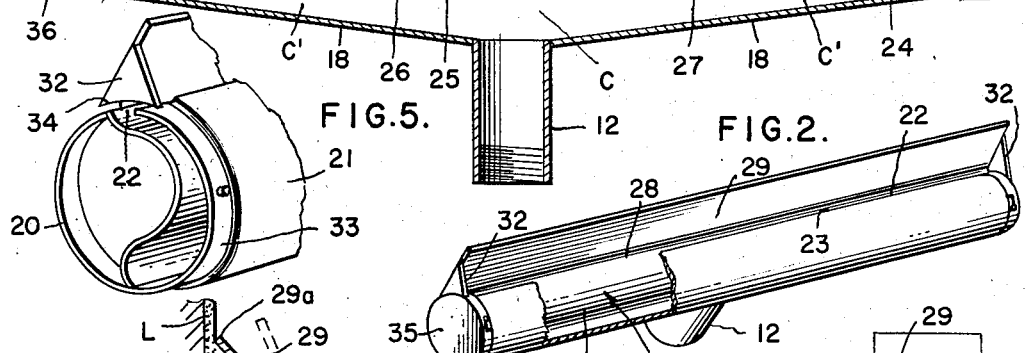
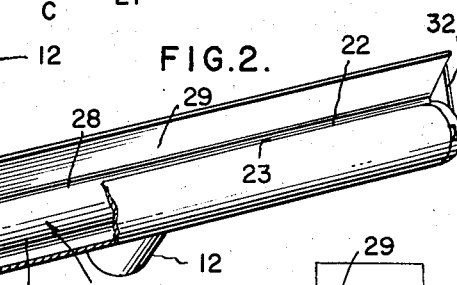
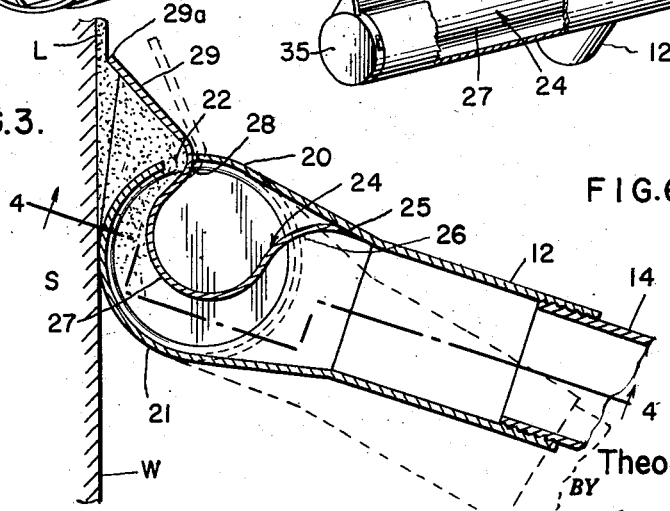
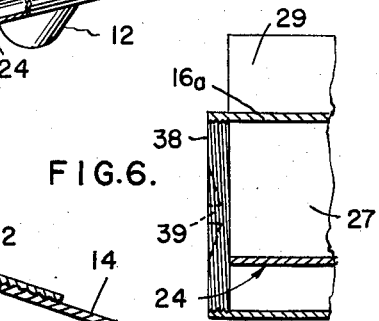
INVENTOR.
Theodore R. Anderson, Sr.
BY United States Patent Office 2,882,716
Patented Apr. 21, 1959

2,882,716

APPLYING AND SPREADING IMPLEMENT FOR MASTIC CEMENTITIOUS MATERIAL

Theodore R. Anderson, Sr., Edgewater, Md.

Application June 22, 1955, Serial No. 517,253

8 Claims. (Cl. 72—130)

This invention relates generally to implements for applying and spreading mortar, plaster and other mastic cementitious material in the construction or finishing of building walls or other surfaces.

More particularly the invention relates to an implement having or formed with a chamber into which the material to be spread is introduced under pressure from a suitable source of supply and from which implement the material is extruded through a slot onto the receiving surface.

Spreading devices for mortar, plaster and like material are known, which are in the form of a hollow head which is adapted to be connected to a source of supply under pressure of the cementitious material. The material under pressure is forced from the source into the head for discharge onto the desired surface through a thickness gauging slot in the head. Such prior devices, however, have certain disadvantages in use. For example, such devices are in many instances so designed that they must be held by the plasterer in the desired spaced relation with the surface and the plasterer must, therefore, judge the thickness of the material as it is being applied and after the desired layer has been started at the selected thickness it is difficult to maintain the implement in such a position as to continue spreading material in an even layer and of constant thickness.

It is also known to provide in prior devices of this kind some means for gauging the distance of the material applying implement from the wall surface, but such means must be changed when layers of different thicknesses are to be applied and accordingly such implements cannot be provided as unitary structures and the provision of gauging elements introduces a possibility of such elements being lost or mislaid so that the value of the implement is accordingly decreased.

In view of the foregoing it is a particular object of the present invention to provide a new and novel implement for spreading mortar, plaster and like cementitious material, which is so designed that the layer of material can be placed on the receiving surface under desired pressure and of an even thickness throughout and at the same time the implement will function to smooth the surface of the applied layer.

A further object of the invention is to provide an implement of the character stated which is formed in such a manner that one wall thereof functions as a rest for engagement against the wall surface to which the material is being applied and further such rest is of a configuration which permits the rotational adjustment of the implement against the wall to facilitate the changing of the thickness of the layer of material being discharged or to enable the plasterer to judge at the beginning of the plastering operation the thickness of the applied layer and to then maintain such thickness during the operation of spreading the layer over the receiving surface.

Still another object of the invention is to provide an applying and spreading implement for mortar, plaster and the like, which is in the form of an elongate nozzle having a longitudinal discharge slot and a material inlet on the side of the nozzle opposite from the slot with opposite walls of the nozzle structure formed and arranged in such a manner as to compress the material as it is forced from the inlet to the outlet slot, thereby effecting the application of the material to the wall surface in a smooth, compact form.

Still another object of the invention is to provide in an implement of the above described character a spreading blade or trowel blade outlining or bordering one side of the outlet slot of the nozzle and against which the outflowing material is forced, with one of the walls of the nozzle formed and arranged with respect to the longitudinal outer edge of the trowel blade to function as a rocking support for the nozzle whereby the nozzle may be maintained steady by the plasterer and the edge of the trowel blade can be maintained at an even or fixed distance from the wall surface.

Still another object of the invention is to provide an implement of the above described character which has the mortar or plaster receiving chamber so designed that the material, as it is introduced into the chamber under pressure, will spread or flow evenly from the transverse center of the nozzle where it is introduced toward opposite ends thereof, thereby assuring the discharge of the material throughout the length of the discharge slot under the same pressure and in an even layer.

A still further object of the invention is to provide in an implement of the character stated a construction wherein the nozzle can be easily and quickly cleansed when the implement is to be put away, by passing a stream of washing fluid through the nozzle from one end to the other.

The invention will be best understood from a consideration of the following detail description taken in connection with the accompanying drawing, with the understanding that the invention is not confined to a strict conformity with the showing of the drawing but may be changed or modified so long as such changes or modifications mark no material departure from the salient features of the invention as expressed in the appended claims.

In the drawing:

Fig. 1 is a view in perspective of a spreading implement for mortar, plaster and like cementitious material constructed in accordance with one embodiment of the present invention, the implement being viewed from the rear or back side;

Fig. 2 is a perspective view of the implement as seen from the front or wall facing side thereof, a portion of the front wall of the implement being broken away;

Fig. 3 is a transverse sectional view taken approximately on the line 3—3 of Fig. 1 showing the implement in position against a wall surface and illustrating the manner in which the cementitious material is discharged from the material chamber onto the wall;

Fig. 4 is a sectional view taken substantially on the line 4—4 of Fig. 3;

Fig. 5 is a view in perspective of one end of the implement from which the cover cap has been removed and showing the end of the inside or partitioning wall of the body;

Fig. 6 is a detail section showing another means of closing the end of the material chamber;

Fig. 7 is a fragmentary detail illustrating another constructional arrangement.

Referring now more particularly to the drawing, the numeral 10 generally designates the head of the implement with which is connected the short tubular stem 12 by means of which the desired cementitious material is introduced into the head from a suitable source of supply under pressure through a hose or pipe 14 which may be connected to the outer end of the stem in a suitable manner. It is preferred that such pipe or hose be connected with the stem 12 by insertion into the end of the stem as shown in Fig. 6, so that no obstructing edges will be formed against which the material can lodge when flowing into the head. The stem may be of a suitable length to function as a handle for the implement or where the implement is to be used overhead or at an elevation beyond the reach of the plasterer, the pipe 14 may be of metal and of such rigidity to serve as a long handle for manipulating the implement.

As above stated, the head 10 of the implement is designed to receive the cementitious material under pressure from a suitable source. Such source may be of a character such as that illustrated, for example, in the patent to Elkins, 1,829,479, where a screw means is provided for forcing material from a hopper into the delivery pipe or the material may be forced from a suitable receptable into the delivery pipe under air or other suitable fluid pressure.

In the construction of the invention here illustrated the head, which as a whole constitutes a discharge nozzle, is shown as being in the form of a substantially cylindrical body generally designated 16. At approximately the transverse center of the body the tubular inlet stem 12 is joined to the wall of the body and at the location where the stem opens into the cylindrical body the wall thereof extends from opposite sides of the stem 12 at an angle or oblique to the longitudinal axis of the body as is clearly shown in Figs. 1 and 4. Such angled or inclined portions of the body wall are designated 18 and as will hereinafter appear, this arrangement of the wall portions 18 provides for a large chamber area at the transverse center of the nozzle which reduces in size or capacity toward the outer ends thereof.

The angled wall portions 18 of the head or nozzle body are on one side merged with the rounded wall portion 20 which constitutes the rear or back top of the head, and on the opposite side these wall portions 18 merge with the rounded or transversely circular portion of the body 16. This latter portion 21 of the head constitutes the forward side as it faces the direction in which the head is moved when in use and it is curved convexly toward the rear portion and opposes the wall surface to which the mortar, plaster or the like is being applied and this convexly curved part functions as a rest or supporting breast to facilitate the maintenance of the nozzle head steady while the material is being discharged and spread over the wall surface.

The body 16 is provided in the rearward portion with the longitudinal material outlet slot 22. This slot extends throughout the length of the body as is clearly shown in Fig. 2, and is defined on side nearest to the forward portion by the edge 23.

As shown in Fig. 3, the slot 22 is located at a distance from the axial center of the stem 12 somewhat greater than 180° around the forward side or wall 21 so that when the convex rest portion is applied against a vertical surface to be coated as illustrated the outlet slot 22 will be at the top side of the implement and spaced outwardly from the wall surface as is clearly shown in Fig. 3.

Extending throughout the length of the body 16 is the inside rear wall 24. This wall has a rear edge 25 which is secured to the wall 20 of the body throughout the length of the latter, and the inside wall curves forwardly from its attached edge 25 toward the wall 21 as indicated at 26 and then is reversely curved in the rearward direction as indicated at 27 to substantially follow the curvature of the breast wall 21 but gradually converge toward the latter to form a restricted mortar passage and this reversely curced portion 27 turn back at the opposite side of the opening 22 from the edge 23, as indicated at 28, where, in the construction shown in Fig. 3, it continues outwardly a substantial distance to form the trowel blade 29. The trowel blade extends, upon the outer side of the body 16, throughout the length of the latter as is clearly shown in Figs. 1, 2 and 4. In the illustration of the construction in Fig. 3 the turned back portions 28 of the inside wall 24 bears against and is secured to the edge of the opening in the rear wall portion 20 and forms the opposite side of the opening 22.

As an alternative construction, as shown in the detail forming Fig. 7, the rear inside wall may be made to terminate at the edge of the outer rear wall, as indicated at 30, and the outer rear wall 20 may be continued as at 31 into the trowel blade, here designated 29ᵃ.

To facilitate the strengthening of the trowel blade 29 there may be provided at each end thereof the substantially triangular webs 32 each of which is integrally formed with the adjacent end edge of the trowel blade and which rests upon the closure element for the adjacent end of the housing or cylinder body 16.

Any suitable means may be provided for closing the two ends of the cylinder body so long as such closure means is of a character which will not interfere with the close placement of the end of the discharge slot 22 against a wall surface when the implement is used to apply plaster or mortar in a corner. In the construction illustrated in Figs. 1 to 5 the two ends of the body 16 are reduced slightly in diameter, as indicated at 33, and the inner edge of the adjacent web 32 is slightly spaced from this reduced end portion as indicated at 34 and a closure cap constituting a head portion 35 and a flange 36 is engaged over the reduced portion 33, the flange thereof encircling such reduced portion and slipping in between the same and the edge of the adjacent web 32, which will be readily apparent. Thus when the closure cap is in place, the edge of the web 32 adjacent thereto will be supported by the flange of the cap.

When the closure caps are in place the heads thereof will also engage the adjacent end of the rear inner wall 24 so as to prevent any of the cementitious material getting past the end of such wall and into the space between this wall 24 and the outer rear wall 20. Any suitable means may be provided for securing the caps in place, such as a pin and bayonet slot connection generally designated 37, or screw threads.

Fig. 6 illustrates another method which may be employed for closing the ends of the cylinder body 16. In this figure the end of the cylinder body which is designated 16ᵃ is internally screw threaded to receive the flat closure disc 38, the periphery of which disc is threaded to engage corresponding threads in the inner surface of the body, and the outer surface of this closure disc is provided with a suitable means, such as the depressed rib 39, which may be grasped by the nose of pliers or some other suitable instrument to facilitate turning the disc for its removal or replacement.

While the implement of the present invention has been illustrated and described as embodying a cylindrical body which may be formed of sheet metal of suitable weight with the inside rear wall 24 and trowel blade 29 formed of like material, it is also contemplated as being within the purview of the present invention to form the nozzle as a cast body or as an extruded body with the elimination of the outer rear wall 20 so that the nozzle would comprise only the forward wall 21 curving convexly upward in a convergent relation with the rear wall 24.

By the provision of the oppositely extending inclined wall portions 18 extending from the opposite sides of the tubular stem 12, with the edge 25 of the wall 24 extending straight throughout the length of the nozzle head, it will be seen that the material when flowing into the head through this stem 12 will first enter a central portion C of maximum capacity and will then spread outwardly or toward the ends of the head through the areas C' of gradually diminishing capacity. This construction assures an even distribution of the cementitious material throughout the length of the nozzle head or, in other words, prevents the channeling of the material directly across the head to the outlet slot 22.

It will also be seen upon reference to Fig. 3 that the space between the opposing walls 21 and 24 gradually decreases in width toward the outlet slot 22 so that as the material enters this space, which is designated S, and flows toward the outlet slot, it will be gradually subjected to increased pressure until it emerges from the slot.

In the use of the implement, reference being had to Fig. 3, the convex face of the forward wall 21 will be positioned against the wall surface W to which the mortar, plaster or other material is to be applied, and it will be seen that as the material flows through the space S toward the outlet slot it will discharge between the point of contact of the rest portion of the wall 21 with the wall W and the underside of the trowel blade 29. The material cannot move down past the wall engaging breast or rest portion of wall 21 and accordingly it will be forced out under desired pressure between the edge 29a of the trowel blade and the face of the wall W in the layer L, the thickness of which can be regulated by the plasterer by rocking the implement against the wall W. Thus as the implement is moved across the surface of the wall, coating material will be discharged under sufficient pressure to cause it to firmly adhere and the surface will be smoothed by the edge 29a of the trowel blade and the operator or plasterer does not have to apply any manual pressure to lay the coat on.

By the provision of the removable end closure for the cylinder body it will be seen that when the operator is through using the implement, it can be easily and quickly cleaned out by removing the end closures and projecting a stream of water or other cleaning fluid therethrough.

I claim:

1. An implement for applying cementitious material to a surface, comprising an elongate hollow body having a wall of arcuate cross section presenting an outer convex face adapted to rest against said surface, a second wall of arcuate cross section positioned rearwardly of the first mentioned wall and having its convex face opposed to the inner, concave face of said first wall and spaced therefrom to form a material receiving chamber therewith, means closing the ends of the chamber, inlet means communicating with said chamber through which material may be introduced into the chamber, the upper portions of said wall being gradually tapered toward each other to present a restricted opening at the upper edge of said first wall, an elongate wide trowel blade forming an angular continuation of said upper portion of the second wall with the included angle between the blade and said upper portion of the second wall enclosing said restricted opening.

2. The invention according to claim 1, wherein said ends closing means are removable to facilitate cleaning the chamber.

3. The invention according to claim 1, with a web plate joined to each end of the trowel blade on the side face of the latter adjacent to the slot and extending therefrom across the slot for bracing connection with an adjacent part of the body.

4. An implement for applying a cementitious material such as mortar, plaster and the like to a surface to be coated, comprising an elongate hollow body of substantially cylindrical form and closed at its ends, a material discharge slot in and extending longitudinally of the wall of the body, a partitioning wall in and extending through the length of the body and having a rear edge connected to the rear wall of the body, said partitioning wall having a transverse curvature generally conforming to the curvature of the front wall of the body and joining the rear longitudinal edge of said slot and spaced from said adjacent portion of the body wall and forming therewith a material receiving chamber communicating with the slot, that portion of the partition wall joining the rear longitudinal edge of the slot and said adjacent portion of the body tapering toward each other such that said chamber is restricted at said slot, a trowel blade bordering the side of the slot with which said transversely curved wall is joined and directed widthwise across and away from the opposite side of the slot, and inlet means communicating with said chamber through which material may be introduced thereinto.

5. The invention according to claim 4, wherein the said inlet means comprises a tubular stem joined at one end to the wall of the body at approximately the transverse center thereof.

6. The invention according to claim 4, wherein the said inlet means comprises a tubular stem joined to the wall of the body at approximately the transverse center thereof and said body having chamber defining portions of its wall extending from opposite sides of the stem toward the ends of the body oblique to the long axis of the body and tapering toward such ends whereby to form the material chamber with a maximum capacity in the mid-portion thereof and decreasing in capacity toward the ends of the body.

7. An implement for applying and spreading cementitious material over a surface such as a building wall, said implement comprising an elongated nozzle body having in transverse section a convexly rounded wall terminating in a longitudinal edge, said rounded wall through a portion of its arcuate extent forming the front side of the body and through the remainder of its arcuate extent to said longitudinal edge forming a rear side of the body, the part of the convex face of the body between said front and rear sides constituting a surface engaging rest, an arcuate rearward wall fixed to said body and spaced from the concave side of said rounded wall, said rearward wall tapering toward said longitudinal edge of the rounded wall but being spaced therefrom to present rearwardly and outwardly across and in spaced relation with said longitudinal edge and forming with said edge a restricted material ejecting slot extending lengthwise of the body, the said rearward wall forming with said convexly rounded wall a mortar chamber leading to said slot, a trowel blade secured to and forming a continuation of said rearward wall and extending rearwardly and outwardly to spread mortar issuing from said slot against a surface adapted to receive the same, and inlet means communicating with said mortar chamber through which cementitious material may be introduced into said chamber.

8. A nozzle head for applying cementitious material comprising an elongated cylindrical body having a rear portion and a forward portion, an elongated slot in the rear portion of said body, a curved wall secured to the rear portion of said body at one side of said slot and extending generally forwardly therefrom, said curved wall and said body defining a mortar chamber therebetween and said curved wall tapering toward said body toward said slot to form a restricted mortar passage to the slot, a trowel blade secured to the rear edge of said slot and extending rearwardly and outwardly to spread said mortar against a wall surface, and inlet means communicating with said mortar chamber and through which mortar may be introduced into the body.

References Cited in the file of this patent

UNITED STATES PATENTS

| | | |
|---|---|---|
| 807,301 | Monta | Dec. 12, 1905 |
| 1,560,666 | Conrad | Nov. 10, 1925 |
| 1,828,738 | Hood | Oct. 27, 1931 |
| 1,829,479 | Elkins | Oct. 27, 1931 |
| 2,198,271 | McCallum | Apr. 23, 1940 |
| 2,630,703 | Sommers | Mar. 10, 1953 |